United States Patent Office 3,490,480
Patented Jan. 20, 1970

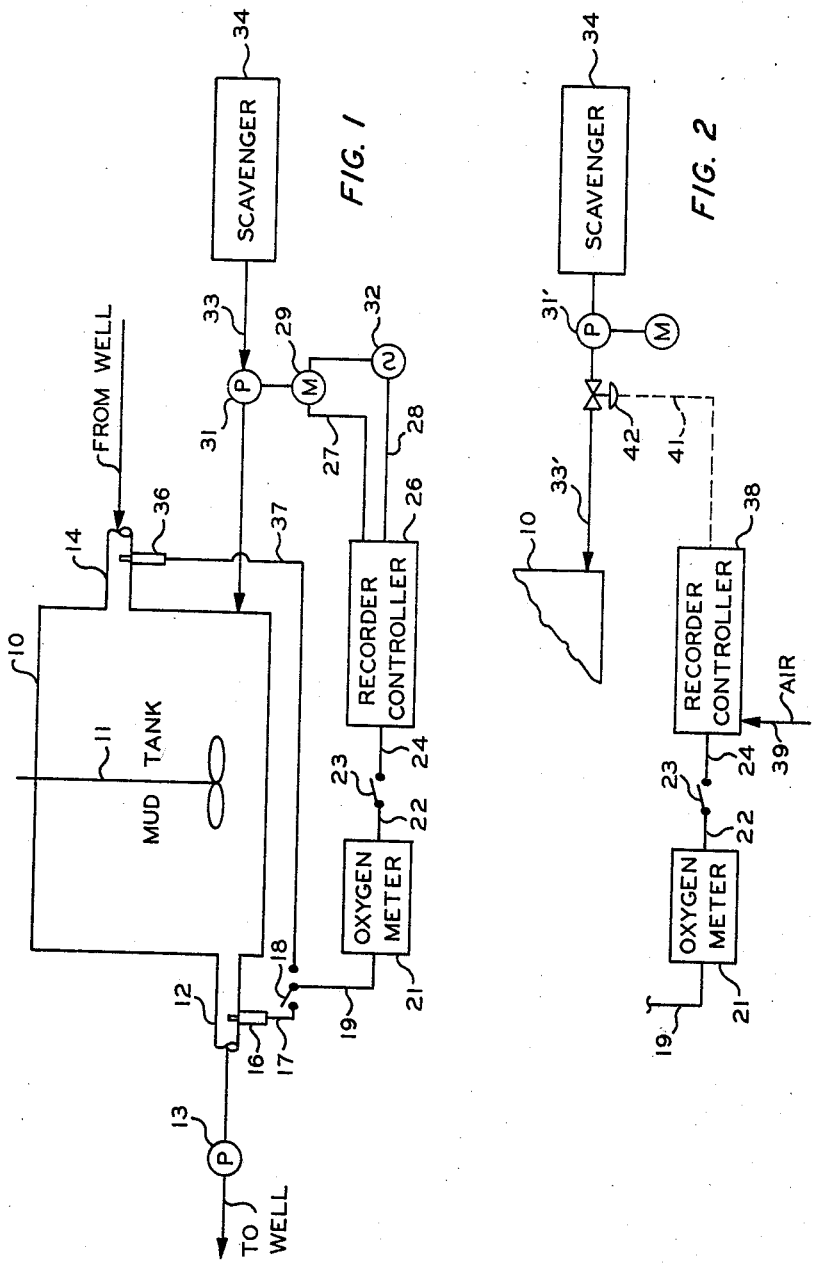

3,490,480
CONTROL OF DRILLING FLUID PROPERTIES
Edwin D. Parsons, Bartlesville, Okla., assignor to Phillips Petroleum Company, a corporation of Delaware
Original application Dec. 19, 1963, Ser. No. 331,828, now Patent No. 3,301,323, dated Jan. 31, 1967. Divided and this application Aug. 19, 1966, Ser. No. 573,523
Int. Cl. G05d 11/02; G01n 11/00, 21/28
U.S. Cl. 137—93                                   3 Claims

ABSTRACT OF THE DISCLOSURE

Apparatus for measuring the concentration of a contaminant in a drilling fluid comprising means for sensing said contaminant in said drilling fluid and a meter for measuring the concentration of said contaminant responsive to a signal from said sensing means. Control means for controlling the flow of a contaminant scavenger material to said drilling fluid are also provided.

---

This application is a division of my copending application Ser. No. 331,828, filed Dec. 19, 1963, now Patent No. 3,301,323.

This invention relates to the control of drilling fluid properties. In one aspect this invention relates to reducing corrosion of well drilling tools during drilling operations. In another aspect this invention relates to maintaining the effectiveness of various additives contained in the drilling fluid during drilling operations.

In the art of drilling wells to tap subterranean deposits of fluids such as oil and/or gas, especially when drilling by the rotary method employing a rotary bit and drill stem, a drilling fluid, usually a compounded fluid made to predetermined physical and chemical properties, is circulated to the bottom of the bore hole, out through openings in the bit at the bottom of the bore hole, and then back up said bore hole to the surface by passage through the annular space between said drill stem and the wall of said bore hole (or between said drill stem and the wall of the casing where casing has been put in place). Reverse circulation wherein the drilling fluid is circulated down said annular space and back to the surface through the drill stem is sometimes practiced also.

The drilling fluid must act as a liquid medium of controlled viscosity for removing cuttings from the bore hole; it must prevent excessive amounts of fluid from flowing from the bore hole into surrounding formations by depositing on the wall of the hole a thin but substantially impervious filter cake; it must possess a gel structure of sufficient strength to hold in suspension solids, particularly during any time the fluid is not circulating; it must serve as a weighting material exerting sufficient pressure to counter-balance any pressure exerted by water, gas, oil, or other fluid from a penetrated structure and to prevent caving or other intrusion into the drill hole. Said drilling fluid must also serve as a lubricant for the bearings of the drill bit and the cutting surface of the bit teeth, and to reduce frictional forces on the drill pipe.

These requirements have been met in the past by employing both aqueous or water base and non-aqueous or oil base drilling fluids. The aqueous drilling fluids normally comprise water, finely divided inorganic materials such as various types of clays and clayey materials, and weighting materials suspended in the water. The non-aqueous or oil base drilling fluids normally comprise a non-aqueous liquid such as crude oil or a petroleum distillate, and a weighting material which can be a clay or other suitable material. In addition to aqueous and non-aqueous drilling fluids as defined above, emulsion-type drilling fluids are often used. These emulsion drilling fluids normally comprise a substantially water-insoluble liquid such as oil, a finely divided inorganic material such as clay, and water, together with a suitable dispersing or emulsifying agent. The two types of emulsion drilling fluids are the oil-in-water emulsion type, sometimes referred to as water base emulsion type, and the water-in-oil emulsion type, sometimes referred to as oil base emulsion type. In the latter, oil forms the continuous phase of the emulsion, and in the former, water or brine forms the continuous phase of the emulsion.

The commonly used drilling fluid materials and the usual drilling fluids composited from said materials are not, in themselves, corrosive. Drilling fluids are usually deliberately composited to have a pH greater than 7 so as not to be corrosive. However, drilling fluids with pH's greater than 7 can be rendered corrosive, and dangerously so, in a very short time during drilling operations. These corrosive conditions are, almost without exception, caused by contaminating substances, e.g., oxygen, carbon dioxide, hydrogen sulfide, dissolved salts, or various combinations thereof.

Dispersed, i.e., dissolved and/or entrained, oxygen, carbon dioxide, and hydrogen sulfide are especially troublesome. In the usual drilling operations it is common practice for the drilling fluid to be in contact with air at the surface of the earth and considerable quantities of air are trapped and absorbed by the drilling fluid. The presence of dissolved oxygen, particularly when available to the drilling fluid from the bubbles of a stable foam, will render a drilling fluid highly corrosive in a very short time. Any thinner or drilling fluid additive which causes the drilling fluid to carry a stable foam permits the fluid to carry air in intimate contact with any dissolved salts that may be present. Downhole the contaminants contact the drill pipe and casing under conditions of relatively high temperature and pressure. This fulfills the conditions necessary to produce an accelerated corrosion rate. The condition is even further aggravated by the overstressing of the drill pipe which frequently occurs during drilling operations. Oxygen can also enter the drilling fluid from oxygen-rich ground water. Carbon dioxide and hydrogen sulfide can also be encountered under drilling conditions and present serious corrosion problems when so encountered. However, oxygen contamination is much more frequent and troublesome because it is potentially present in almost every well drilled and can occur regardless of the pH of drilling fluid.

Contamination of a drilling fluid with dissolved and/or entrained oxygen not only causes serious corrosion problems, but can also cause marked changes in the rheological and other properties of the drilling fluid itself. Most drilling fluids contain at least one additive or special agent in addition to the common ingredients, e.g., finely divided solids and water or other fluid. Said additives or special agents are used for particular purposes, e.g., water loss control, thinning, etc. The big majority of said additives are subject to oxidative degradation caused by the presence of dissolved and/or entrained oxygen. When so degraded many of said additives lose their effectiveness, the properties of the drilling fluid change, and the drilling fluid itself loses its effectiveness, often with serious if not disastrous consequences. Examples of oxygen degradable materials include starch, tannin containing materials, lignin containing materials, and to some extent carboxymethylcellulose.

The present invention provides a solution for the above difficulties. Broadly speaking, the present invention resides in eliminating or at least controlling and improving undesirable properties of a drilling fluid, caused by the presence therein of a contaminant such as oxygen, carbon dioxide, or hydrogen sulfide, by measuring the amount of said contaminant and adding to the drilling fluid in accordance with said measurement an amount of a scavenger material sufficient to reduce and/or maintain the concentration of said contaminant at a desirably low level and thus reduce metal corrosion and degradation of the drilling fluid additives to within permissible limits, economically speaking.

An object of this invention is to provide an improved drilling fluid. Another object of this invention is to provide a method of reducing the amount and/or rate of corrosion of the drilling tools, casing, etc. during drilling operations. Another object of this invention is to provide a method of maintaining the effectiveness of various additives used in drilling fluids during the drilling operations. Another obpect of this invention is to provide a method of controlling the rheological properties of a drilling fluid during drilling operations. Other aspects, objects, and advantages of the invention will be apparent to those skilled in the art in view of this disclosure.

Thus, according to the invention, there is provided a method for controlling and improving undesirable properties of a well drilling fluid caused by the presence of a substance selected from the group consisting of oxygen, carbon dioxide, and hydrogen sulfide contained therein, which method comprises: measuring the content of said substance in said drilling fluid; and adding to said drilling fluid, in accordance with said measurement, an amount of a scavenger material sufficient to react with the greater portion of said contained substance and thereby remove same from said drilling fluid.

Further according to the invention, there are provided combinations of apparatus which can be employed in carrying out the methods of the invention.

The problems created by the presence of oxygen, carbon dioxide, or hydrogen sulfide in drilling fluids are not the same in frequency of occurrence or effect obtained. However, the presence of carbon dioxide and hydrogen sulfide in drilling fluids, while frequent enough to be a serious problem is usually the result of some abnormal conditions encountered during the drilling operation such as penetrating a pocket or permeable formation containing carbon dioxide or hydrogen sulfide. Underground water streams sometimes contain carbon dioxide or hydrogen sulfide. Furthermore, carbon dioxide and hydrogen sulfide are both recognized as acidic materials in that aqueous solutions of each have a pH of less than 7. Due to these acidic properties, carbon dioxide is usually not present as such when the pH of the drilling fluid is above about 8.5, and hydrogen sulfide is usually not present as such when the pH of the drilling fluid is above about 11. However, it is not always convenient or possible to control the pH of the drilling fluid. Furthermore, a high pH drilling fluid is not always desirable because the high pH sometimes has an adverse effect on some additives and in some respects is a health hazard in that it is injurious to the skin of the drilling crew.

Dissolved and/or entrained oxygen can be present in almost every drilling fluid in normal drilling operations. The drilling fluid tanks customarily employed at the earth's surface to store the drilling fluid are usually open to the atmosphere. Under such conditions the drilling fluid can entrap or absorb large quantities of air. As pointed out above, this is particularly true when using a drilling fluid which carries a stable foam or an emulsion-type drilling fluid. Furthermore, the corrosive and oxidative degradation actions of oxygen can occur regardless of the pH of the drilling fluid. Thus, oxygen corrosion of the drilling tools, casing, etc., can exist at high pH. Also, as pointed out above, oxygen causes an oxidative degradation of many of the commonly used drilling fluid additives. Thus, the problems caused by the presence of dissolved and/or entrained oxygen in a drilling fluid are much more common and much more serious than the problems caused by other contaminants such as carbon dioxide and hydrogen sulfide discussed above.

FIGURE 1 is a schematic representation of combinations of apparatus which can be employed to carry out the methods of the invention.

FIGURE 2 is a schematic representation of another combination of apparatus which can be employed to carry out the method of the invention.

Referring now to the drawings, wherein like reference numerals are employed to denote like elements, the invention will be more fully explained. Since contamination of a drilling fluid with oxygen is much more common and more serious, the drawings will be described in terms of a drilling fluid contaminated with oxygen. It should be understood that many valves, pumps, gauges, etc., have been omitted from the drawings as not being necessary to explain the invention to those skilled in the art and to simplify said drawings. All of the individual elements of apparatus illustrated in the drawings are conventional commercially available equipment. Thus, applicant's invention, insofar as apparatus is concerned, does not reside in said individual elements, but does reside in various combinations of said elements.

Referring now to FIGURE 1, there is illustrated a portion of the surface equipment which is employed in connection with drilling operations wherein drilling fluids are utilized. Mud tank 10 can be any suitable type of receptacle employed at the surface of the earth for storing the drilling fluid or mud being used in the drilling of the well. Said tank is equipped with a suitable agitation means such as mechanical stirrer 11 which can be rotated by any suitable means not shown. Frequently, so-called "mud guns" or jets are employed for mixing purposes. An outlet conduit 12, having a suitable pump 13 disposed therein, is connected to one side of said tank and extends therefrom to a hose which in turn is connected to a swivel at the head of the drill stem for introducing the drilling fluid into the well. A second conduit 14 extends from the upper part of the annulus around said drill stem to said mud tank and serves as a return conduit for returning the drilling fluid from the well to said tank 10. A first oxygen sensor 16 is attached to and extends into said first conduit 12. Said sensor should be mounted in inverted position in the bottom of said conduit to avoid the possibility of trapping bubbles of oxygen in the end of the sensor. Said sensor can be positioned in said conduit 12 either upstream of or downstream from said pump 13.

Said sensor is basically a polarographic oxygen electrode. As such, it contains a silver anode and a gold cathode, both protected from the drilling fluid by a thin membrane of Teflon, or polyethylene, or other similar material. A cellulose-base potassium chloride gel is held in place by said membrane and serves as an electrolytic agent. Since said membrane is permeable to gases, any oxygen present in the drilling fluid (either dissolved or entrained) can diffuse therethrough to the cathode where it takes part in an oxidation-reduction reaction. With potential applied across said anode and said cathode, oxygen which reaches said cathode will be reduced, causing a current to flow. The magnitude of said current is proportional to the amount of oxygen present in the sample being measured, here the drilling fluid flowing in conduit 12. Said sensor 16 is a conventional piece of apparatus which is commercially available from Beckman Instruments Inc., Fullerton, Calif. Said sensor is capable of operating in the pressure range of 0 to 50 p.s.i. The sensor is temperature compensated to ±5 percent for the range of 59 to 112° F. and this is the preferred temperature range in which to operate same. However, said sensor can be operated with good accuracy (for comparative purposes) over a temperature range of 32 to 194° F. For oxygen measurements which are independent of liquid flow rates it is recommended that the liquid velocity past the tip of sensor 16 be at least 1.8 feet per second in order to make the oxygen measurement independent of flow rate. However, for comparative purposes between samples measured at essentially the same velocity, liquid velocities as low as 0.7 foot per second have been found to give reliable results. Further details concerning said sensor can be found in Beckman Bulletin 0–4041. Other details regarding such polarographic oxygen electrodes can be found in U.S. Patent 2,913,386.

Said sensor is connected by means of a suitable cable 17, a suitable switch 18, and a suitable cable 19 to oxygen meter 21. Said oxygen meter is also a conventional piece of apparatus which is commercially available from Beckman Instruments Inc., and further details concerning same can be found in said Bulletin 0–4041. Beckman Model 778 oxygen analyzer or meter is a presently preferred instrument for use in the practice of the invention. The current produced in said sensor 16 is amplified in meter 21 and can be read out in desired units of percent oxygen, millimeters of oxygen partial pressure, percent air saturation, or parts per million oxygen, depending upon the calibration of the meter. Thus, in operation, by closing switch 18 one can determine the amount of oxygen in the drilling fluid flowing past sensor 16 and read the quantity of said oxygen directly from oxygen meter 21.

Said oxygen meter 21 is provided with a suitable outlet and if desired a suitable cable 22, a suitable switch 23 and a suitable cable 24 can be employed for connecting said oxygen meter to a suitable recorder-controller 26 which will make a continuous record of said oxygen measurement. Said recorder-controller 26 is a conventional piece of equipment and can be any suitable type of such instrument. An example of one presently preferred instrument of this type is Westronics Recorder Controller Model S5A/M2H manufactured by Westronics, Inc., Fort Worth, Tex., and described in their Bulletin No. 195(4–61).

Said recorder-controller is provided with a backset limit control switch and thus, if desired, can be employed to control the addition of an oxygen scavenger material to the drilling fluid in mud tank 10 responsive to the above-described oxygen measurement. This is accomplished by connecting said backset limit switch in known manner to suitable electrical lead wires 27 and 28. Said lead wire 27 is connected to said switch and to a motor 29 which drives pump 31. Said lead wire 28 is connected through a suitable source of current 32 to said motor and said switch in said recorder-controller 26. Said pump 31 is disposed in a conduit 33 which is connected at one end to scavenger supply tank 34 and at its other end to said mud tank 10.

In the operation of the automatic control system just described the backset limit switch in recorder-controller 26 will serve to start motor 29 responsive to a predetermined high oxygen content measurement made by sensor 16 and oxygen meter 21 and to stop said motor responsive to a predetermined low oxygen content measurement, and thus will introduce scavenger material from tank 34 via conduit 33 into tank 10 as needed in an amount sufficient to control the oxygen content in the mud being pumped from tank 10 via conduit 12.

If desired, the oxygen measurement can be made by means of a sensor 36 which is disposed in mud return conduit 14. Said sensor 36 is connected by means of a suitable cable 37 to switch 18. In operation, oxygen measurements utilizing sensor 36 can be made in the same manner as those described above. However, as will be realized by those skilled in the art, when the oxygen measurement is made on the drilling fluid in conduit 14 one must know the amount of drilling fluid flowing through said conduit 14. Thus, when the flow rate through conduit 14 is substantially constant the control system illustrated will operate satisfactorily when calibrated for various oxygen contents and types of scavenger material. However, for varying flow rates the illustrated system will not operate independently of the flow rate. Instrumentation systems which can be employed in connection with varying flow rates are known and it is within the scope of the invention to utilize such an instrumentation system which has not been described here for the sake of brevity.

In FIGURE 2 there is illustrated an alternative form of control system which can be employed in the practice of the invention. In this combination of apparatus recorder-controller 38 is a conventional pneumatic type instrument. Such an instrument is supplied with a source of instrument air via conduit 39 and converts the electrical signal in cable 24 from meter 21 into a pneumatic signal which is discharged via pneumatic conduit 41 to the motor of valve 42 disposed in conduit 33′ which is connected by means of pump 31′ to scavenger supply tank 34. Said pump 31′ can conveniently be any suitable type of centrifugal pump. The pneumatic signal from the recorder-controller 38 serves to vary the opening of valve 42, and thus control the amount of scavenger material pumped by pump 31′, responsive to the oxygen measurement effected as described above. Said recorder-controller 38 can be any suitable type of such instrument. An example of one presently preferred type of instrument for this service is an ElectroniK Air-O-Line Controller, Type No. 152P, described in Catalogue 1531 of the Minneapolis-Honeywell Regulator Company, Philadelphia, Pa.

In the practice of the invention it is desirable to reduce and/or maintain the concentration level of the contaminant, e.g., oxygen, carbon dioxide, and hydrogen sulfide, in the drilling fluid to a value at which the amount of metal corrosion and/or oxidative degradation of the drilling fluid additives will be within permissible limits, economically speaking. There will thus be a maximum permissible concentration level for said contaminant. As will be understood by those skilled in the art in view of this disclosure, said maximum concentration level will vary from well to well depending upon conditions encountered in the drilling of the well, the characteristics of the particular drilling fluid being used, and the formation being drilled. Thus, while the exact or specific concentration level of contaminant which it is desired to maintain in the drilling fluid is not of the essence of the invention, it can be stated, as a guide, that it is desirable to maintain the concentration of said contaminant at a level of less than 1, preferably less than 0.5, more preferably less than 0.2 part by weight per million parts by weight of drilling fluid.

Likewise, the amount of scavenger material added to the drilling fluid in the practice of the invention is not of the essence of the invention. The amount of added scavenger material will depend upon the amount of contaminant present in the drilling fluid at the time the practice of the invention is initiated, as when it is desired to initially reduce the concentration of the contaminant, and/or the amount of the contaminant entering the drilling fluid during the course of the drilling operations. Thus, the amount of scavenger material will also vary with and depend upon conditions encountered in the drilling of the well, the characteristics of the particular drilling fluid being used, the formation being drilled, and the particular scavenger material being used. For example, when one is using a tannin containing material as an oxygen scavenging agent, an amount within the range of 0.1 to 3, preferably 0.2 to 1, pounds of tannin material per barrel of drilling fluid will generally be used. When using said tannin materials it is usually desirable to use sufficient sodium hydroxide or other alkaline material to increase the pH of the drilling fluid to approximately 11 or 11.5. When one is using hydrazine sulfate as an oxygen scavenger material the amount used will generally be within the range of 0.01 to 0.5, preferably 0.05 to 0.3, pound per barrel of drilling fluid.

The invention is not limited to the use of any particular scavenger materials. Any suitable scavenging material can be used in the practice of the invention. The choice of a particular scavenger material will depend upon the particular contaminant being removed, the amount of said contaminant, the effectiveness of said scavenger material, and the presence of other additives in the drilling fluid. Thus, a suitable scavenger material is one which will reduce the amount of corrosive action and/or oxidative degradation of the drilling fluid additives to within permissible limits, economically speaking, and which is also compatible with the other components of the drilling fluid. Those skilled in the art will be able, in view of this disclosure, to make simple routine tests to determine the suitability of any candidate scavenger material.

Examples of suitable oxygen scavenger materials include, among others, the following: Tannex, an organic drilling fluid thinner which is a substitute for quebracho and which can be used in the same manner as quebracho, is comprised of a quebracho extract and lignitic material, and is available from the Baroid Sales Division, National Lead Company; quebracho; Q-Broxin, a commercial iron chrome lignosulfate available from the Puget Sound Pulp and Timber Company; hydrazine, salts of hydrazine such as hydrazine sulfate; various other tannin containing materials; various sulfites including Nalco-19 (sodium sulfite catalyzed with cobalt chloride); Formapon (sodium formaldehyde sulfoxylate); various bisulfites; various hydrosulfites; sulfur dioxide; and the like. Examples of suitable carbon dioxide scavenger materials include, among others, the following: lime, barium hydroxide, magnesium hydroxide, and the like. Examples of suitable hydrogen sulfide scavenger materials include among others, the following: zinc acetate, cadmium chloride, ferrous sulfate, and the like.

Said scavenger materials can be added to the drilling fluid in any suitable manner depending upon the type of drilling fluid being used. Thus, when using an aqueous drilling fluid, e.g., water base or oil-in-water emulsion, an aqueous dispersion such as an aqueous solution or an aqueous suspension of the scavenger material can be used. When the drilling fluid is an oil base drilling fluid or a water-in-oil emulsion drilling fluid, a dispersion of the scavenger material in the oil used in said drilling fluid, or a dispersion of the scavenger material in a suitable organic solvent, can be used.

It is recognized that some of the above-mentioned scavenger materials are frequently utilized in drilling fluids for other purposes. Thus, quebracho and various other tannin containing materials are sometimes used as thinners for drilling fluids. However, insofar as is presently known, none of said materials have previously been used as scavenger materials for oxygen. Furthermore, said scavenger materials have never been added to a drilling fluid in controlled amounts in accordance with a measurement of the oxygen concentration in said drilling fluid, said controlled amount being an amount sufficient to reduce the metal corrosion and/or oxidative degradation of additives in the drilling fluid to within permissible limits.

In many instances, the amount of scavenger material so added to a drilling fluid to control the level of oxygen concentration therein is much less than that normally used in drilling fluids for the control of other properties such as rheological properties. For example, quebracho is normally added to drilling fluids in amounts within the range of from 2 to 3 pounds of quebracho per barrel of drilling fluid. In the practice of the invention the amount of quebracho in many instances will be within the range of from 0.1 to 1 pound of quebracho per barrel of drilling fluid. As a further example, Q-Broxin is normally added to drilling fluids in amounts from 2 to 20 pounds per barrel of drilling fluid. In the practice of the invention the amount of Q-Broxin will in many instances be within the range of 0.1 to 1 pound per barrel of drilling fluid.

When an additive is utilized in a drilling fluid for a particular purpose, for example as a thinner to control viscosity, it is desirable to maintain the controlled property of the drilling fluid substantially constant and during the course of the drilling operations said drilling fluid is tested intermittently for this purpose. However, as pointed out above, many of the additives are subject to oxidative degradation through the action of dissolved and/or entrained oxygen in the drilling fluid. This complicates the problem of maintaining the properties of the drilling fluid substantially constant. Sometimes changes can occur relatively gradually, but to a detrimental extent, before the drilling crew is aware of the change. In other instances, as when the additive possesses both thinning and oxygen scavenging properties, the oxidized form of the additive may be effective for thinning purposes but not further effective as an oxygen scavenger. In such instances, the drilling fluid would apparently be satisfactory but the oxygen content could build up or change to the extent that serious corrosion problems would be encountered. An another example, an additive added as a water loss control agent may gradually be rendered ineffective by oxygen degradation and additional amounts of the additive then required. By continuously metering or measuring the oxygen content of the drilling fluid and taking appropriate action by the introduction of a suitable scavenger material in accordance with said measurements, the invention provides a method of avoiding such difficulties by preventing oxygen degradation and maintaining the effectiveness of the additive originally present. This is one of the outstanding advantages of the invention.

The above-described apparatus is not applicable for the determination of dissolved and/or entrained carbon dioxide and hydrogen sulfide in drilling fluids. However, the amount of said contaminating substances in the drilling fluid can be determined by other means known to the art. For example, one can acidify a sample of the drilling fluid, then expel the gas therefrom under vacuum (with heating if desired or necessary). Carbon dioxide in the collected gas can then be determined chromatographically. Hydrogen sulfide in the collected gas can be absorbed in zinc acetate, and the precipitated sulfide then determined iodometrically. Methods of oxygen analysis other than those described above can also be employed in the practice of the invention. For example, the well known Winkler method described in "Betz Handbook of Industrial Water Conditioning", Betz Laboratories, Inc., Philadelphia, Pa. (1962) 6th ed., p. 384, can be utilized. However, said methods described above are preferred because of simplicity, convenience, and continuous operation.

The following examples will serve to further illustrate the invention. The drilling fluid or mud used in said examples was a commercial drilling mud which had previously been used in actual drilling operations in the drilling of a well in Lincoln County, Wyoming. During said drilling operations severe corrosion of the drill stem occurred. Metallurgical examination of sections of said drill stem showed said corrosion to be oxygen corrosion. The mud had the following approximate composition.

| | |
|---|---|
| Driscose [1], lbs./bbl. | 1.5 |
| Soltex [2], lbs./bbl. | 3.5 |
| Bentonite, lbs./bbl. | 9 |
| Diesel Oil, vol. percent | 12.5 |
| Water, vol. percent | 84.5 |
| Total Solids [3], vol. percent | 3.0 |

[1] Sodium carboxymethylcellulose.
[2] A sulfonated asphalt (sodium salt).
[3] Includes an estimated 2 to 4 lbs. per barrel of drilled solids.

The properties of the mud were as follows:

| | |
|---|---|
| Density, lbs./gal. | 9.1 |
| API water loss, ml./30 min. | 3.4 |
| Plastic viscosity, cp. | 21 |
| Yield point, lbs./100 sq. ft. | 8 |
| Initial gel, lbs./100 sq. ft. | 0 |
| 10 minute gel, lbs./100 sq. ft. | 3 |
| pH | 9.0 |

The following examples were all carried out at room temperature.

EXAMPLE I

A one-gallon sample or drilling mud was placed in a recirculating system comprising a reservoir, a mud flow conduit connected to the bottom portion of said reservoir, a small centrifugal pump connected to said conduit, a mud return conduit connected to the discharge of said pump for returning the mud to said reservoir, an oxygen sensor (like sensor 16 described above) disposed in said return conduit, and an oxygen meter essentially like meter 21 described above. The mud, while circulating, was saturated with air blown through a fritted glass tube immersed in the mud. After saturation with air, the mud was swept or purged with nitrogen to remove the air. The oxygen meter, which was calibrated initially to read 100 percent with the sensor in air, read 71.0 percent with the sensor in the air-saturated mud and 0.9 percent with the sensor in the nitrogen-swept, air-free mud. This run shows the feasibility of employing an oxygen analyzer for the measurement of oxygen in drilling mud.

EXAMPLE II

A run was made to determine if Q-Broxin is an effective oxygen scavenger. The nitrogen-swept drilling mud of Example I was resaturated with air, and Q-Broxin in an amount of approximately 1 pound per barrel of mud was added thereto. The thoroughly mixed, flowing mud stream then gave an oxygen meter reading of about 13 percent, compared to the reading of 71.0 percent previously obtained for the air-saturated mud, thus demonstrating Q-Broxin to be an oxygen scavenger.

EXAMPLE III

A one-gallon sample of drilling mud (pH~11.0) in the circulating system described in Example I was saturated with air blown through a fritted glass tube immersed in the mud, thus increasing the oxygen concentration in the mud from about 2 p.p.m. to 6.3 p.p.m. The flow of air was then discontinued, and 10 grams of Tannex (1.0 lb. of Tannex per bbl. of mud) was added. Upon continued circulation the oxygen content of the mud decreased to 3.3 p.p.m. after 13 minutes. Sodium hydroxide (5.0 grams) was then added. After 2 minutes the oxygen content of the circulating mud (pH=11.6) had decreased to about 0.02 p.p.m. The mud was then circulated for about 29 hours, during which time absorption of oxygen from the atmosphere resulted in the mud (pH=11.05) having an oxygen concentration of 5.0 p.p.m. Upon the addition of 10 grams of Tannex, the oxygen concentration of the mud decreased to 0.1 p.p.m. after a circulation period of 5 minutes at which time the pH was 10.05.

This run demonstrates the effectiveness of tannin containing materials such as Tannex as oxygen scavenging materials.

EXAMPLE IV

A one-gallon sample of drilling mud in the same circulating system as described in Example I was treated with 2 grams of Formapon (0.2 lb. of Formapon per bbl. of mud). The oxygen concentration decreased from an initial value of 4.6 p.p.m. to 0.05 p.p.m. after 7 minutes circulation.

This run demonstrates the effectiveness of Formapon as oxygen scavenger material.

EXAMPLE V

A one-gallon sample of drilling mud in the same circulating system as described in Example I was treated with 2 grams of hydrazine sulfate (0.2 lb. of hydrazine sulfate per bbl. of mud). The oxygen concentration decreased from an initial level of 3.6 p.p.m. to 0.04 p.p.m. after 5 minutes circulation.

This run demonstrates the effectiveness of hydrazine salts as an oxygen scavenger material.

While certain embodiments of the invention have been described for illustrative purposes, the invention obviously is not limited thereto. Various other modifications will be apparent to those skilled in the art in view of this disclosure. Such modifications are within the spirit and scope of the invention.

I claim:

1. An apparatus for measuring the concentration of oxygen contaminant in a drilling fluid used in the drilling of a well, comprising, in combination: a drilling fluid supply tank; an outlet conduit connected to said tank and in communication with said well for passing drilling fluid from said tank to said well; an inlet conduit connected to said tank and in communication with said well for passing drilling fluid from said well to said tank; oxygen contaminant sensing means disposed in at least one of said conduits; an oxygen meter for measuring the concentration of said oxygen contaminant in said drilling fluid responsive to a signal from said sensing means; means for transmitting a signal from said sensing means to said meter; a controller, means for transmitting a signal from said oxygen meter to said controller responsive to said signal from said oxygen sensing means; an oxygen scavenger material supply conduit connected to said tank; flow control means disposed in said oxygen scavenger supply conduit for controlling the flow of oxygen scavenger material therethrough; and means operatively connecting said controller and said flow control means for actuating said flow control means responsive to said signal received by said controller from said meter.

2. Apparatus according to claim 1 wherein said signal transmitted from said sensing means to said meter is an electrical signal; said signal transmitted from said meter to said controller is an electrical signal; said flow control means comprises a pump and a motor for driving said pump operatively connected thereto; and means are provided connecting said controller and said motor for starting and stopping said motor responsive to said signal received by said controller from said meter.

3. Apparatus according to claim 1 wherein said signal transmitted from said sensing means to said meter is an electrical signal; said signal transmitted from said meter to said controller is an electrical signal; a pump is disposed in said scavenger supply conduit; said flow control means comprises a flow control valve disposed in said scavenger supply conduit downstream from said pump; and means are provited connecting said controller and said flow control valve for actuating said valve responsive to said signal received by said contoller from said meter.

References Cited

UNITED STATES PATENTS

| | | | |
|---|---|---|---|
| 2,214,674 | 9/1940 | Hayward | 175—206 X |
| 2,341,169 | 2/1944 | Wilson et al. | 175—66 X |
| 2,764,465 | 9/1956 | Rohrback et al. | 166—1 |
| 2,913,386 | 11/1959 | Clark | 324—71 X |
| 2,919,898 | 1/1960 | Marwil et al. | 175—66 |
| 2,923,151 | 2/1960 | Engle et al. | 175—206 X |
| 2,923,355 | 2/1960 | Arczynski | 166—1 |
| 3,303,895 | 2/1967 | Fontenot | 175—66 |

FOREIGN PATENTS 688,642   3/1953   Great Britain.

WILLIAM F. O'DEA, Primary Examiner

DAVID J. ZOBKIW, Assistant Examiner

U.S. Cl. X.R.

73—53